(12) United States Patent
Suk

(10) Patent No.: US 7,578,435 B2
(45) Date of Patent: Aug. 25, 2009

(54) COUPONING SYSTEM

(75) Inventor: Alex Suk, Gurnee, IL (US)

(73) Assignee: Unicous Marketing Inc., Chicago, IL (US)

( * ) Notice: Subject to any disclaimer, the term of this patent is extended or adjusted under 35 U.S.C. 154(b) by 0 days.

(21) Appl. No.: 11/893,479

(22) Filed: Aug. 16, 2007

(65) Prior Publication Data

US 2008/0046325 A1 Feb. 21, 2008

Related U.S. Application Data

(63) Continuation of application No. 10/772,631, filed on Feb. 5, 2004, now abandoned.

(51) Int. Cl.
G07F 19/00 (2006.01)
(52) U.S. Cl. .................. 235/379; 705/16; 705/26
(58) Field of Classification Search .............. 235/379; 705/26, 27, 16, 17
See application file for complete search history.

(56) References Cited

U.S. PATENT DOCUMENTS

| | | | |
|---|---|---|---|
| RE34,915 E | 4/1995 | Nichtberger et al. |
| 5,513,102 A | 4/1996 | Auriemma |
| 5,644,723 A | 7/1997 | Deaton et al. |
| 5,857,175 A | 1/1999 | Day et al. |
| 5,945,653 A | 8/1999 | Walker et al. |
| 6,041,309 A | 3/2000 | Laor |
| 6,076,069 A | 6/2000 | Laor |
| 6,260,758 B1 | 7/2001 | Blumberg |
| 6,321,210 B1 | 11/2001 | O'Brien et al. |
| 6,332,128 B1 | 12/2001 | Nicholson |
| 6,334,108 B1 | 12/2001 | Deaton et al. |
| 6,778,967 B1 | 8/2004 | Nicholson |
| 6,937,995 B1 | 8/2005 | Kepecs |
| 2002/0013728 A1 | 1/2002 | Wilkman |
| 2002/0032609 A1 | 3/2002 | Wilkman |
| 2002/0040321 A1 | 4/2002 | Nicholson |
| 2002/0046089 A1 | 4/2002 | Zorn |
| 2002/0049631 A1 | 4/2002 | Williams |
| 2002/0107738 A1 | 8/2002 | Beach et al. |
| 2002/0143626 A1 | 10/2002 | Voltmer et al. |
| 2002/0178060 A1 | 11/2002 | Sheehan |
| 2002/0188509 A1 | 12/2002 | Ariff et al. |
| 2002/0194069 A1 | 12/2002 | Thakur et al. |
| 2003/0028518 A1 | 2/2003 | Mankoff |
| 2003/0029540 A1 | 2/2003 | Stromberg |
| 2003/0110130 A1 | 6/2003 | Pelletier |
| 2003/0130891 A1 | 7/2003 | Jacobs |
| 2003/0158796 A1 | 8/2003 | Balent |
| 2003/0167203 A1 | 9/2003 | Thorne et al. |
| 2003/0195806 A1 | 10/2003 | Wilman et al. |
| 2003/0200146 A1 | 10/2003 | Levin et al. |
| 2004/0024638 A1 | 2/2004 | Restis |
| 2004/0049427 A1 | 3/2004 | Tami et al. |
| 2004/0186773 A1 | 9/2004 | George et al. |
| 2005/0160003 A1 | 7/2005 | Berardi et al. |
| 2005/0194454 A1 | 9/2005 | Ferber et al. |
| 2006/0020512 A1 | 1/2006 | Lucas et al. |

FOREIGN PATENT DOCUMENTS

KR 10-0390531 6/2002

*Primary Examiner*—Karl D. Frech
(74) *Attorney, Agent, or Firm*—Husch Blackwell Sanders LLP Welsh & Katz

(57) ABSTRACT

A method and apparatus are provided for a method of offering coupons to a consumer at a point of sale. The method includes the steps of detecting entry of an identifier of an item to be purchased by the consumer at the point of sale, searching a database to identify a coupon that provides a discount on a purchase price of the item when used with a predetermined credit card and calculating a discount offered by the coupon for purchase of the item with the predetermined credit card; and displaying the calculated discount to the consumer.

22 Claims, 3 Drawing Sheets

COUPONING SYSTEM

CROSS REFERENCE TO RELATED APPLICATIONS

This application is a continuation of U.S. application Ser. No. 10/772,631, filed Feb. 5, 2004.

FIELD OF THE INVENTION

The field of the invention relates to the marketing of consumer products and more particularly to the use of coupons in consumer purchases.

BACKGROUND OF THE INVENTION

The use of coupons is generally known in consumer sales. Coupons are typically distributed by newspaper or mail and are usually structured to provide a consumer with an incentive to buy a product.

Typically, a coupon provides a discount on the purchase price of an item. The discount may be offered directly by listing a dollar value of the discount on the face of the coupon or indirectly by providing a free premium if the consumer purchases an item. The premium may be an offer for a second item free or the offer of another related (or unrelated) item.

Coupons are typically used by manufacturers to move merchandise that is overstocked or outdated. Coupons allow the manufacture to offer an item at a reduced price without actually changing a list price for an item.

Once a merchant accepts a coupon, the merchant may redeem the coupon for cash or other consideration from the manufacturer. Coupon clearing houses usually perform this function.

In addition to collecting coupons from merchants, the coupon clearing house may count and authenticating the collected coupons. The coupon clearing house may also calculate and request payment of the value of the collected coupons from the manufacturer and forward the money to the merchant. The coupon clearing house usually collects a commission from the manufacture based upon the value of the coupons cashed.

While coupons work well in helping manufacturers dispose of merchandise, the handling of coupons is burdensome and subject to fraud. Accordingly, a need exists for a less labor-intensive method of generating and processing coupons.

SUMMARY

A method and apparatus are provided for a method of offering coupons to a consumer at a point of sale. The method includes the steps of detecting entry of an identifier of an item to be purchased by the consumer at the point of sale, searching a database to identify a coupon that provides a discount on a purchase price of the item when used with a predetermined credit card and calculating a discount offered by the coupon for purchase of the item with the predetermined credit card; and displaying the calculated discount to the consumer.

DETAILED DESCRIPTION OF AN ILLUSTRATED EMBODIMENT

Figure 1:
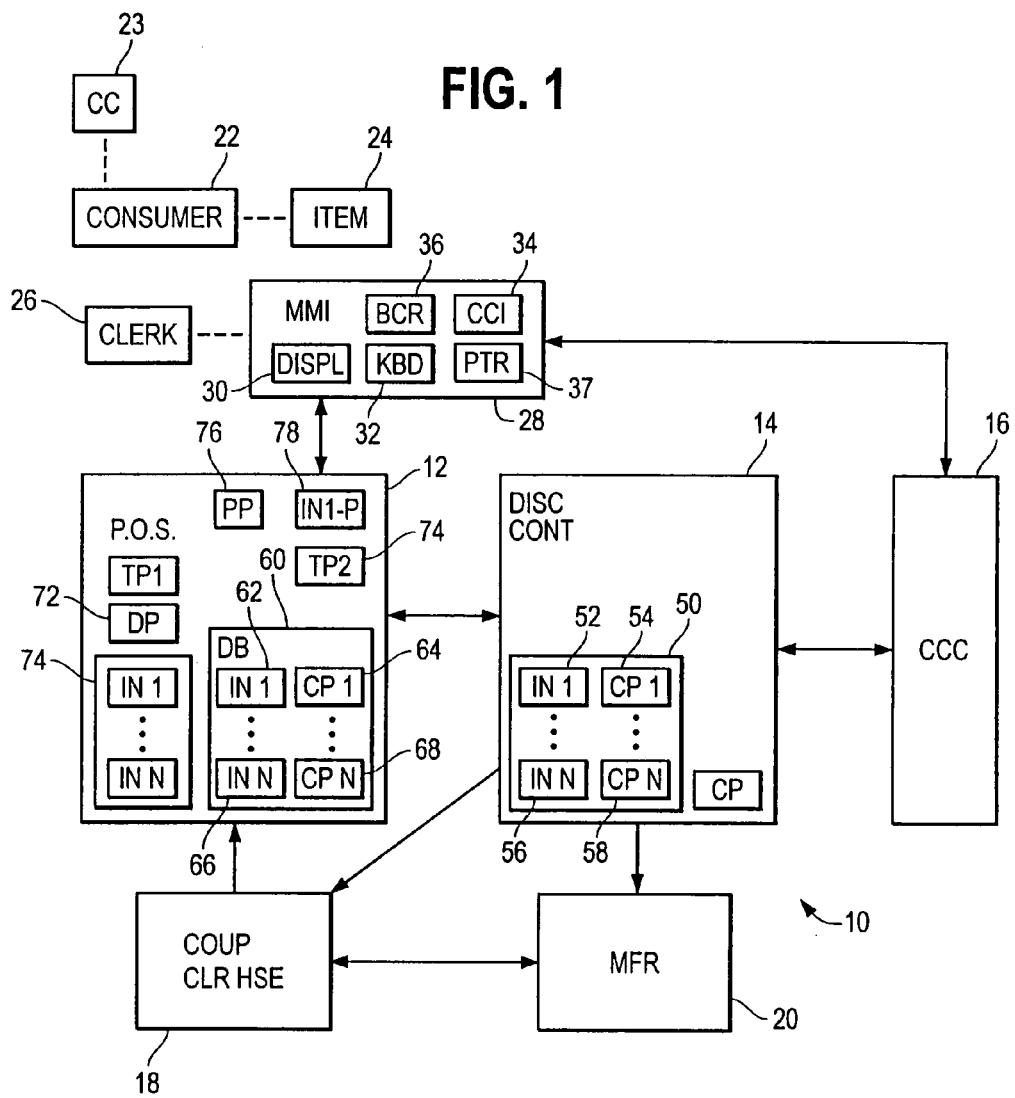
FIG. 1 depicts a couponing system in accordance with an illustrated embodiment of the invention.

FIG. 1 is a block diagram of a couponing system 10 shown generally in accordance with an illustrated embodiment of the invention. The couponing system 10 may be sponsored by a credit card company in an appropriate consumer environment (e.g., a grocery store) to encourage use of the credit card offered by the credit card company. In effect, the couponing system 10 generates a discount to its users using coupons offered by manufacturers.

As would be well-known to those of skill in the art, the use of paper coupons is a labor intensive process for both manufacturer and retailer. In addition to accepting and granting credit for paper coupons, the retailer must also count and accept responsibility for physically transferring accepted paper coupons to the coupon clearing house.

Further, many coupons are easily duplicated. Fraudulent paper coupons are often not recognized by the clerk at the point of sale (POS). Where fraudulent coupons are later recognized by the manufacture or coupon clearing house, the value of the fraudulent coupons are deducted from any payment given to the retailer resulting in a loss to the retailer for credit previously given to the consumer.

The couponing system 10 eliminates the problems of fraud by only issuing coupons when a valid sale occurs and tracks the use of the coupons. Since the couponing system 10 both issues and accepts its own coupons, there is no reason to generate a paper coupon in any tangible form.

In addition, the couponing system 10 can be used to issue and track electronic coupons of many different manufacturers, thereby reducing the per coupon cost. It should be noted in this regard, that the cost of operating the couponing system 10 would not be practical for a manufacturer because of the limited number of coupons traded by a single manufacturer. In addition, the retailer would not be allowed to sponsor the couponing system 10 because the possibility of fraud.

Figure 3:
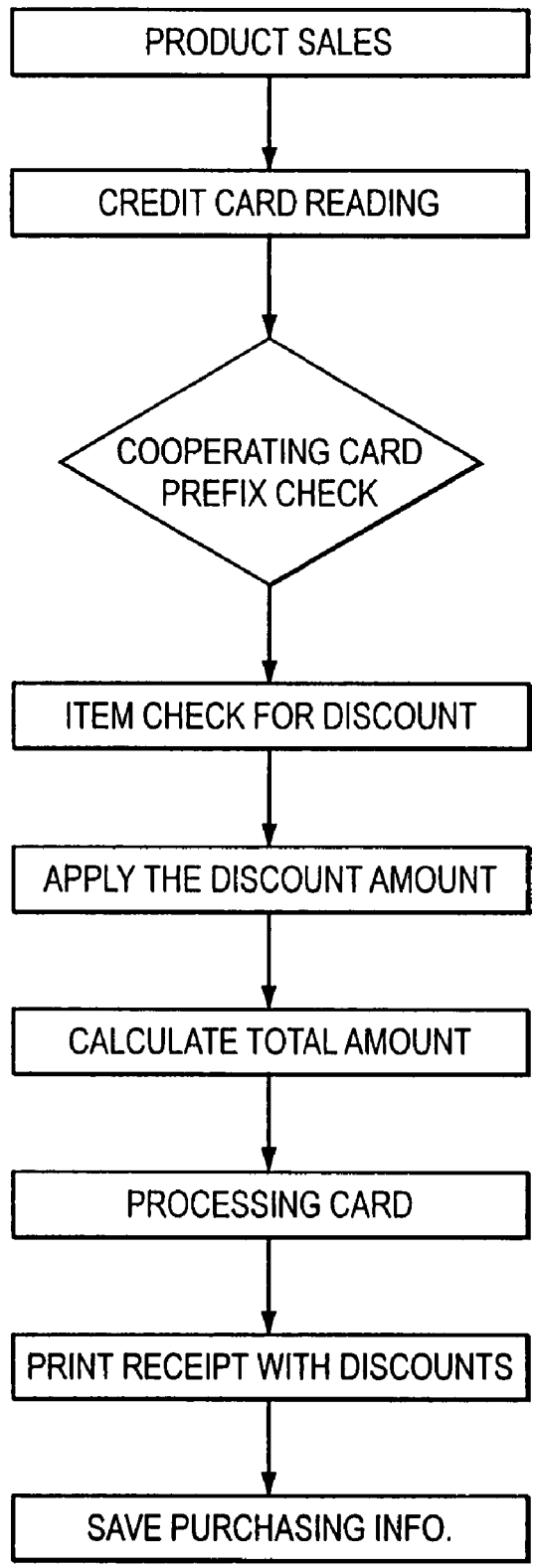
FIG. 3 is a flow chart of steps that may be followed by the system of FIG. 1.
Figure 4:
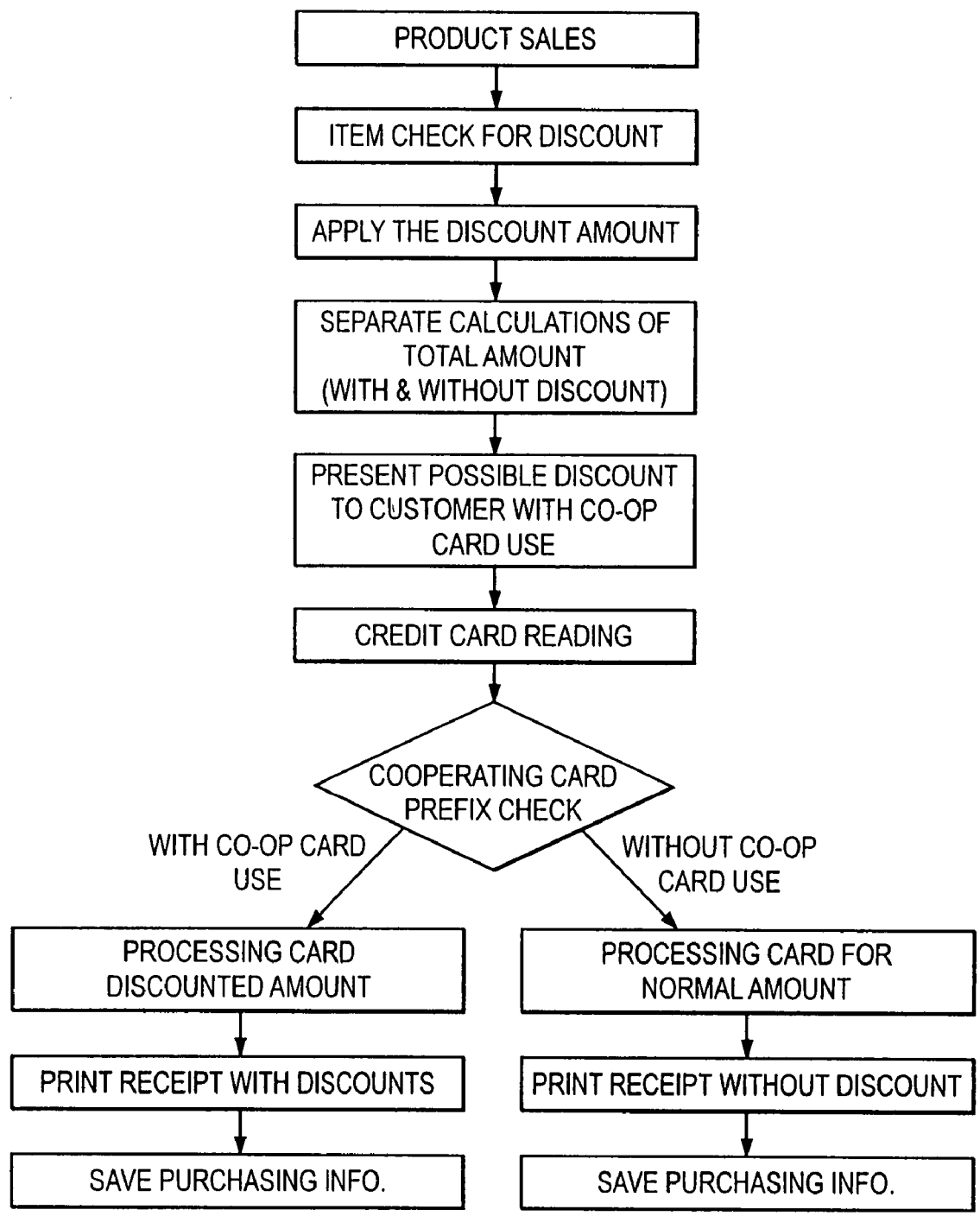
FIG. 4 is a flow chart of steps that may be followed by the system of FIG. 1 under an alternate embodiment.

The system 10 may include a point of sale (POS) device 12, and a discount controller 14. FIGS. 3 and 4 depicts process steps that may be followed by the system 10 of FIG. 1.

The POS device 12 may be a conventional check-out terminal (station) with a data interface that is connected to the discount controller 14. The discount controller 14 functions to transfer coupon information to and receive purchase information from the POS device 12 through data interface.

The clerk 26 may identify items 24 to the POS 12 by entering identifiers (e.g., a Universal Product Code (UPC) of the item 24 through a keyboard 32. Alternatively, a bar code reader 36 may be used to identify the UPC of items 24 to the system 10.

Once an item 24 has been recognized, the UPC or other identifier of the item 24 may be processed within the POS 12. Alternatively, the identifier of the item 24 may be transferred through the data interface to the discount controller 14 where the discount controller 14 functions to identify any coupon(s) that could be used in conjunction with purchase of the item(s) 24.

In general, the discount controller 14 may create a discount file 50 that contains a list of identifiers 52, 56 of items 24 and respective coupons 54, 58 associated with the items 24. A copy of the file 50 (now labeled 60) may be downloaded through the data interface to the POS 12.

As each item 24 is recognized at the POS 12, a pricing processor 76 may search a pricing file 78 to retrieve a price for the item 24 that has been determined by an owner of the POS 12. In addition, a discount processor 70 may search the file 60 to locate the identifier 62, 66 of the item 24 and any associated coupons 64, 68. The price of the item 24 without the coupon 64, 68 may be transferred by the pricing processor 76 to a first totalizing processor 72. In addition, the price of the item 24 reduced within the discount processor 70 by the value of the coupon 64, 68 may be transferred to a second totalizing processor 74.

Figure 2:
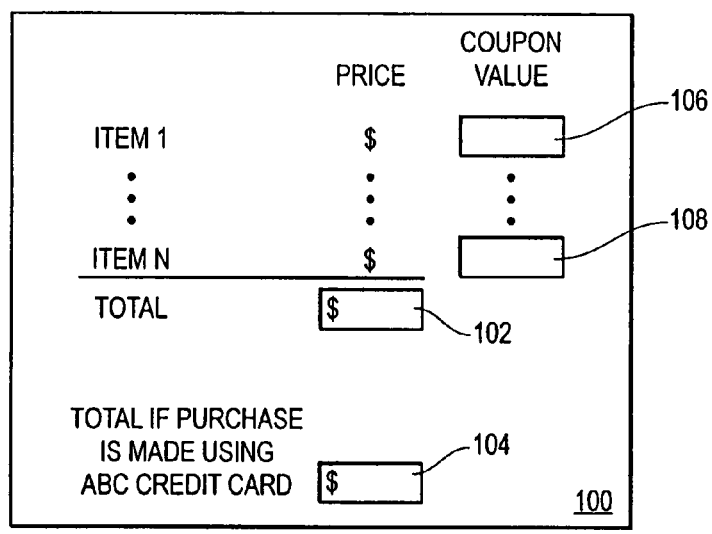
FIG. 2 depicts a display that may be used with the system of FIG. 1.

Once all the items 24 to be purchased by the consumer 22 have been recognized at the POS 12, a sales summary 100 (FIG. 2) may be presented to the consumer 22. The sales summary 100 may include a first total of the purchase 102 without use of the sponsoring credit card and a second total of the purchase 104 with the use of the sponsoring credit card. Any available coupons 106, 108 for purchased items 24 (or simply the discounts provided by the use of the coupons) may also be displayed. The sales summary 100 may be provided on the display 30 at the POS 12 and/or printed by a printer 37 on a sales receipt.

If the consumer 22 should choose to use the sponsoring credit card 23, then the discount controller 14 may detect such use through the credit card company 16 or directly through the POS 12 by reading a prefix of the credit card number. Upon detection of use of the sponsoring credit card 23 (e.g., by entry of a valid account number of the credit card 23 through the POS 12), the discount controller 14 may authorize the discounts associated with the coupons and transfers authorization to the POS 12.

If the discount controller 14 should detect a competing credit card (FIG. 4), then the discounts offered by the coupons are not applied. In this case the consumer 22 is notified that the discounts are not applicable and the POS terminal 12 simply prints a message on the sales receipt notifying the consumer 22 of the discounts that would have been available if the proper predetermined credit card 23 had been used.

As an alternative to the discount controller 14 directly controlling the sale, the system 10 may simply transfer the file 50 (60) to the POS 12 and the discount processor 70 may accumulate and save a record 74 of each coupon 64, 68 used in the purchase of each item 24. Periodically (e.g., once a day), the discount processor 70 may transfer a file 74 containing a summary of coupons and identifier of the item 24 to the discount processor 14. The discount processor 14, in turn, may divide the coupons of the file 74 based upon manufacturer and transfer a record of the coupons used to respective clearing house 18 of the manufacturer 20 and to the manufacturer 20. Alternatively, the discount controller 70 may divide coupons based upon source and transfer a record to the discount processor 14 and clearing house 18 at the same time.

Upon receipt of the coupon record, the coupon clearing house 18 may verify use of the coupons based upon sales through the POS 12 and request payment for the value of the coupons from the manufacturer 20. In addition, the coupon clearing house 18 may collect a commission based upon coupon use. Similarly, an owner of the discount controller 14 may also collect a commission from the manufacturer 20 based upon the value of coupons used. An owner of the POS 12 may receive a handling fee for accepting the coupons.

The couponing system 10 allows competing credit card companies to encourage use of their respective credit cards in a manner that may not incur any direct cost to the credit card company. In addition, credit card companies may enter into promotional agreements whereby the sponsoring credit card company may share in the cost of the coupons to increase sales of the manufacturing company and billing volume of the credit card company. In all cases, the coupon system 10 benefits the consumer by automatically identifying and providing coupons that the consumer may not be aware of.

A specific embodiment of method and apparatus for distributing coupons has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of offering coupons by a bankcard issuer through a couponing system to a consumer at a point of sale, such method comprising the steps of:
   selecting an item for inclusion in the couponing system;
   detecting entry of an identifier of the item to be purchased by the consumer at the point of sale;
   searching a database using the identifier of the item to identify a coupon that provides a discount on a purchase price of the item to any consumer when used with a card of the bank card issuer;
   calculating a discount offered by the coupon for purchase of the item when purchased with the card; and
   displaying at the point of sale the calculated discount available to the consumer based upon use of the card and which calculated discount is not applicable with competing cards.

2. The method of offering coupons as in claim 1 further comprising displaying a price of the item along with the discount.

3. The method of offering coupons as in claim 1 further comprising detecting entry of an identifier of the card.

4. The method of offering coupons as in claim 3 further comprising detecting acceptance of the predetermined card and printing out a receipt showing the calculated discount provided by use of the card.

5. The method of offering coupons as in claim 4 further comprising transferring a file containing the detected acceptance of the card and an identifier of the purchased item to a discount processing system.

6. The method of offering coupons as in claim 5 further comprising transferring a summary of purchase of the item to a coupon clearing house and to a manufacturer of the item.

7. The method of offering coupons as in claim 6 further comprising calculating a commission for processing the coupon for purchase of the item and forwarding the commission to the coupon clearing house and the discount processing system.

8. The method of offering coupons as in claim 7 further comprising calculating a commission for processing the coupon and sending the calculated commission to an owner of the point of sale.

9. The method of offering coupons as in claim 1 further comprising detecting entry of an identifier of another card that is not the predetermined card.

10. The method of offering coupons as in claim 9 further comprising detecting acceptance of the other card and printing out a receipt showing the displayed calculated amount provided by use of the other card and the calculated discount that would have been provided by use of the predetermined card.

11. An apparatus for offering coupons through a couponing system sponsored by a bank card company to a consumer at a point of sale where the point of sale accepts a bank card provided by the sponsoring bank card company, such apparatus comprising:

means for selecting an items for inclusion in the couponing system;
means for preparing a discount file containing an identifier of said item
means for detecting entry of said identifier of the item to be purchased by the consumer at the point of sale;
means for searching a database using the detected identifier of the item to identify a coupon that provides a discount on a purchase price of the item to any consumer when used with the bank card provided by the sponsoring bank card company;
means for calculating a discount offered by the coupon for purchase of the item with the bank card; and
means for displaying at the point of sale the calculated discount available to the consumer based upon use of the bank card provided by the sponsoring card company and which is not applicable with competing bank cards.

12. The apparatus for offering coupons as in claim 11 further comprising means for detecting entry of an identifier of the bank card.

13. The apparatus for offering coupons as in claim 12 further comprising means for detecting acceptance of the bank card and printing out a receipt showing the calculated discount provided by use of the bank card.

14. The apparatus for offering coupons as in claim 13 further comprising means for transferring a file containing the detected acceptance of the bank card and an identifier of the purchased item to a discount processing system.

15. The apparatus for offering coupons as in claim 14 further comprising means for transferring a summary of purchase of the item to a coupon clearing house and to a manufacturer of the item.

16. The apparatus for offering coupons as in claim 15 further comprising means for calculating a commission for processing the coupon for purchase of the item and forwarding the commission to the coupon clearing house and the discount processing system.

17. The apparatus for offering coupons as in claim 16 further comprising means for calculating a commission for processing the coupon and forwarding the calculated commission to an owner of the point of sale.

18. The apparatus for offering coupons as in claim 11 further comprising means for detecting entry of an identifier of another card that is not the bank card.

19. The apparatus for offering coupons as in claim 18 further comprising means for detecting acceptance of the competing card and printing out a receipt showing the displayed calculated amount provided by use of the competing card and the calculated discount that would have been provided by use of the bank card.

20. An apparatus for offering coupons through a couponing system sponsored by a bank card company to a consumer at a point of sale where the point of sale accepts a bank card such apparatus comprising:

a point of sale terminal adapted to detect entry of an identifier of an item to be purchased by the consumer at the point of sale;
a discount file containing an identifier of said item
a database adapted to identify a discount based upon the detected identifier of the item and providing a discount on a purchase price of the item to any consumer when used with the bank card;
a discount processor adapted to calculate a discount offered by the coupon for purchase of the item with the bank card; and
a display for displaying at the point of sale the calculated discount available to the consumer based upon use of the bank card and which calculated discount is not applicable with other bank cards.

21. The apparatus for offering coupons as in claim 20 further comprising a bar code reader adapted to detect entry of an identifier of the bank card.

22. The apparatus for offering coupons as in claim 21 further comprising a printer adapted to print a receipt showing the calculated discount provided by use of the bank card.

* * * * *